United States Patent Office 3,462,493
Patented Aug. 19, 1969

3,462,493
PROCESS FOR MAKING TRIETHYLENE-
TETRAMINE
William P. Coker and George E. Ham, Lake Jackson,
Tex., assignors to The Dow Chemical Company, Midland, Mich., a corporation of Delaware
No Drawing. Filed Jan. 16, 1967, Ser. No. 609,348
Int. Cl. C07c 87/20, 85/04
U.S. Cl. 260—583                                          7 Claims

ABSTRACT OF THE DISCLOSURE

Ethylene halides react with excess ethylenediamine at 0–150° C. to produce triethylenetetramine.

BACKGROUND OF THE INVENTION

Field of the invention

This invention relates to processes for making triethylenetetramine by the reaction of ethylenediamine with an ethylene halide.

Description of the prior art

The reaction of ethylenediamine with ethylene bromide has been reported (Sieber, Ber., 23, 326 (1890)) but the only product found was said to be piperazine. The boiling point shows that the product was not actually piperazine.

SUMMARY OF THE INVENTION

It has now been discovered that linear triethylenetetramine (TETA) substantially free of the branched-chain isomer, tris(2-aminoethyl)amine, can be obtained by the reaction of an ethylene halide with excess ethylenediamine (EDA) at 0–150° C. Theoretically, only two moles of EDA are needed to react with a mole of ethylene halide. In practice, however, we have found that much better results are obtained when a substantial excess of the amine is used. Suitable proportions are 5:1 to 80:1, or more, the preferred proportions being 10:1 to 30:1. The temperature at which the reaction is effected can be varied widely. Thus, the reaction proceeds at ordinary room temperature, or even at 0° C. Faster reaction is obtained at moderately elevated temperatures, such as 50–150° C. Still higher temperatures may be used, especially in the later stages of the reaction, but are not generally advantageous.

The reaction time varies widely, depending on the nature and proportions of reactants and, especially, the temperature. Usually the reaction is substantially completed in 1–30 minutes at temperatures of 100–150° C. while as long as several days may be required at low temperatures. As a practical matter, the reaction is conducted so as to be essentially completed in about 0.5 to 5 hours.

Other useful and desirable products are usually produced concurrently with TETA in the process of the invention. One of special interest is piperazinoethylethylenediamine (PEEDA):

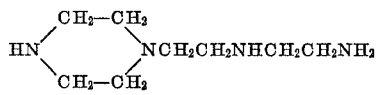

Other valuable coproducts that can be readily separated from the reaction product include 1-(2-aminoethyl)aziridine (AEA). The latter can be recycled in the process and thus converted to TETA or PEEDA.

In carrying out the process of the invention it is sufficient to mix the reactants in the desired proportions, maintain the mixture at a suitable reaction temperature until substantial reaction has occured, and then separate the desired product or products from the reaction mixture. No solvent, diluent, catalyst, or other additive is required, though the addition of water and/or HCl improves yields somewhat. Pressure is not critical, normal atmospheric pressure being suitable and convenient.

The products are conveniently separated by distillation at or below atmospheric pressure. If AEA is to be separated as one of the products, it is preferred to keep the reaction and distillation temperatures below about 80° C. to avoid further reaction. It is also preferable to make the reaction mixture alkaline with a strong base, such as NaOH, before separation or distillation of the product.

DETAILED DESCRIPTION

Table I summarizes the results of a series of experiments in which EDA and ethylene dichloride (EDC) were reacted as indicated and the reaction products were analyzed by vapor phase chromatography. The branched-chain compound, tris(2-aminoethyl)amine, was not found in any of the products. All experiments were run until substantially all of the EDC has been consumed. The reaction mixtures were then treated with a substantial excess of 50 percent by weight aqueous NaOH solution after which the upper clear liquid amine layer was separated and analyzed.

TABLE I

| Example No. | Mole ratio, EDA/EDC | Reaction time, minutes | Temp., °C. | Yield, percent | | | |
|---|---|---|---|---|---|---|---|
| | | | | TETA | PEEDA | AEA | Piperazine |
| 1 | 30 | 100 | 120 | 43.8 | 5.8 | 0 | 40.8 |
| 2 | 20 | 60 | 120 | 44.3 | 9.6 | 0 | 40.1 |
| 3 | 10 | 120 | 125 | 38.7 | 22.0 | 0 | 33.9 |
| 4 | 20 | 1,320 | 10 | 10.6 | 13.4 | 21.4 | 44.7 |
| 5 | 10 | 1,560 | 10 | 25.0 | 19.5 | 11.4 | 36.4 |
| 6 | 20 | 412 | 25 | 10.5 | 13.6 | 20.9 | 46.8 |
| 7 | 20 | 2,700 | 0 | 9.6 | 14.2 | 16.3 | 54.1 |
| 8 | 5 | 390 | 30 | 18.5 | 31.3 | 7.9 | 26.6 |
| 9 [1] | 5 | 240 | 106 | 58.2 | 19.7 | 0 | 8.5 |
| 10 [1] | 10 | 120 | 110 | 71.1 | 18.1 | 0 | 14.0 |
| 11 [1] | 28 | 180 | 110 | 60.2 | 10.0 | 0 | 16.9 |
| 12 [2] | 57 | 180 | 26 | 13.5 | 11.7 | Trace | 49.0 |
| 13 [3] | 20 | 60 | 123 | 50.8 | 15.9 | 0 | 37.2 |

[1] The EDA was diluted with an equal weight of water.
[2] The reaction mixture contained 6 wt. percent of HCl, based on EDA+EDC, added as conc. hydrochloric acid.
[3] The reaction mixture contained 3 moles of HCl per mole of EDC, added as conc. hydrochloric acid.

As may be seen from Examples 9–13, the presence of water and/or HCl in the reaction mixture improved the yields of TETA, as well as accelerating the reaction. Suitable proportions are up to 200% of water, by weight, based on EDA and up to 10% of HCl, by weight, based on EDC. The latter is preferably added as ordinary aqueous hydrochloric acid of about 20–35% concentration by weight.

A valuable feature of the process of the invention is the concomitant production of piperazine, a valuable coproduct. Because of its low boiling point (145° C. at atm. press.) it is easily separated from TETA and PEEDA. The latter two compounds are similar in many properties and uses. For this reason it is often desirable to produce them as a cogeneric mixture which is obtained by distilling lower-boiling materials from the reaction product. The residue consists essentially of these two materials and is often used without further purification. This residue is useful for many of the applications for which commercial TETA is presently employed and indeed is superior for some applications, e.g. curing epoxy resins.

When ethylene bromide or chlorobromide is substituted for the ethylene chloride used in the above examples, the rate of reaction is increased substantially but the same products are produced.

We claim:

1. The process of making triethylenetetramine comprising reacting by contacting at 0° to 150° C. an ethylene halide with at least about 5 molar equivalents of ethylenediamine, the halogen in the halide being chlorine or bromine.

2. The process of claim 1 wherein the ethylene halide is ethylene chloride.

3. The process of claim 1 wherein water is added to the reaction mixture.

4. The process of claim 1 wherein HCl is added to the reaction mixture.

5. The process of claim 1 wherein a triethylenetetramine concentrate is produced as a residue by separating from the reaction product those components having boiling points below that of triethylenetetramine.

6. The process of claim 1 wherein the molar ratio of ethylenediamine to ethylene halide is at least 10:1.

7. The process of claim 2 wherein the molar ratio of ethylenediamine to ethylene chloride is at least 10:1 and the reaction is conducted in the presence of water and HCl.

References Cited

UNITED STATES PATENTS

| 2,414,018 | 1/1947 | Carson. |
| 2,675,387 | 4/1954 | Van Hook et al. |

FOREIGN PATENTS

| 186,624 | 8/1956 | Austria. |

CHARLES B. PARKER, Primary Examiner

R. L. RAYMOND, Assistant Examiner

U.S. Cl. X.R.

260—239, 268